United States Patent [19]

Marvel et al.

[11] 4,359,568

[45] Nov. 16, 1982

[54] POLYAROMATIC AMIDES CONTAINING 1,3-BUTADIENE UNITS

[75] Inventors: Carl S. Marvel, Tucson, Ariz.; Venkatesa Sankaran, Wilmington, Del.

[73] Assignee: The United States of America as represented by the Secretary of the Air Force, Washington, D.C.

[21] Appl. No.: 265,719

[22] Filed: May 20, 1981

[51] Int. Cl.$^3$ .............................................. C08G 69/32
[52] U.S. Cl. .................................... 528/183; 528/337; 528/345; 528/348; 528/336; 585/601
[58] Field of Search ................ 528/345, 348, 337, 183

[56] References Cited

U.S. PATENT DOCUMENTS

| | | | |
|---|---|---|---|
| 2,687,383 | 8/1954 | D'Alelio | 260/2.2 |
| 3,637,602 | 1/1972 | Conciatori | 528/345 |
| 3,697,478 | 10/1972 | Bach et al. | 528/345 |
| 3,759,860 | 9/1973 | Peaker | 260/29.7 SQ |
| 3,935,167 | 1/1976 | Marvel et al. | 260/49 |
| 4,010,147 | 3/1977 | Rose | 260/793 M |
| 4,231,913 | 11/1980 | Kyritsos et al. | 528/345 |

Primary Examiner—Harold D. Anderson
Attorney, Agent, or Firm—Donald J. Singer; William J. O'Brien

[57] ABSTRACT

A process for synthesizing novel polyaromatic amides containing 1,3-butadiene groups along the polymer chain by effecting a reaction between the acid chloride of 1,4-bis-p-carboxyphenyl-1,3-butadiene and an aromatic diamine. These polyamides have been found to be especially useful as laminating resins for a variety of laminating applications.

12 Claims, No Drawings

POLYAROMATIC AMIDES CONTAINING 1,3-BUTADIENE UNITS

STATEMENT OF GOVERNMENT INTEREST

The invention described herein may be manufactured and used by or for the Government for governmental purposes without the payment of any royalty thereon.

BACKGROUND OF THE INVENTION

This invention relates to a series of novel polymeric compounds and to a process for their synthesis. More particularly, this invention relates to novel polyaromatic amides which contain 1,3-butadiene groups along the polymer chain and to a novel process for their synthesis.

The cross-linking processes or curing techniques relied on heretofore in the production of laminating resins often involved the liberation of gaseous side products during the curing reaction. The gaseous products so produced tended to form voids or gas pockets in the cured resin thereby substantially weakening the structural strength and stability of the laminated products fabricated therefrom. Generally, aromatic heterocyclic nuclei connected with functional groups, such as carbonyl, sulfonyl and ether linkages, form the backbone of the polymeric chains of those resins found to be suitable for laminating applications. Unfortunately, the curing of these materials to form the typical polymeric material suitable for laminating purposes produces gaseous products which result in the formation of the objectionable voids referred to above. With this invention, however, it has been found that butadiene containing aromatic-substituted polyamides were void-free after cross-linking and possessed the requisite characteristics of thermal stability and strength.

SUMMARY OF THE INVENTION

The present invention concerns itself with the synthesis of novel polyaromatic amides containing 1,3-butadiene groups. These polyamides have been found to be especially useful as laminating resins for a variety of laminating applications. The synthesis is effected through a condensation polymerization of acid chloride of 1,4-bis-p-carboxyphenyl-1,3-butadiene and an aromatic diamine. The resulting product is insoluble in all solvents.

Accordingly, the primary object of this invention is to provide novel polyaromatic amides containing 1,3-butadiene groups on the polymeric chain.

Another object of this invention is to provide a polymerizable material that does not develop voids or gaseous pockets in the finally cross-linked or cured product.

Still another object of this invention is to provide a polymerized material that is particularly adapted for use as a laminating resin and is characterized by good solubility before curing together with good thermal stability, strength and absence of gaseous voids after curing.

The above and still further objects and advantages of the present invention will become more readily apparent upon consideration of the following detailed description thereof.

DESCRIPTION OF THE PREFERRED EMBODIMENTS

In accordance with the present invention, it has been found that the above-noted objects can be carried into effect by synthesizing novel polyaromatic amides that contain about 50 mole percent of 1,3-butadiene groups on the polymer chain. The novel polymers of this invention are illustrated by the following structural formula

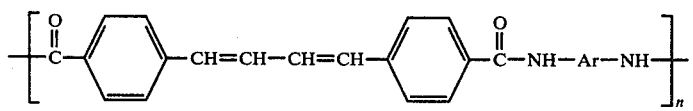

wherein Ar is a radical selected from the group consisting of

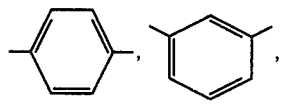

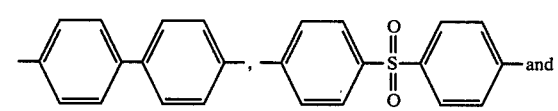

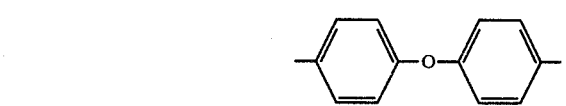

The compounds of this invention represent a novel group of 1,3-butadiene containing polymers that have been found to be especially effective as laminating resins in the fabrication of laminated structures. They are prepared by condensation polymerization of the acid chloride of 1,4-bis-p-carboxyphenyl-1,3-butadiene (XI) and an aromatic diamine. The resulting polymers are insoluble in all solvents and possess a high degree of thermal stability and strength as well as an absence of gaseous voids. The following example illustrates the general reaction schemes involved in synthesizing the polymers of this invention.

EXAMPLE I

Two m mole of a suitable aromatic diamine was dissolved in 10 ml of dry N,N-dimethyl acetamide (DMAC) in a 50 ml 3-necked flask fitted with stirrer and nitrogen inlet. The solution was cooled to 0° C. and 2 m mole of the acid chloride of 1,4-bis-p-carboxyphenyl-1,3-butadiene (XI) was added. Though the solution was vigorously stirred, it became viscous and stirring stopped after 30 minutes. After three hours, the mixture was treated with water and the precipitated polyamide was filtered, washed with hot methanol and dried at 100° C.

The aromatic diamines found to be suitable for carrying out the present invention are p-diaminobenzene, m-diaminobenzene, benzidine, 4,4'-oxydianiline and bis(4-aminobenzene) sulfone. Table I which follows, further illustrates the invention and discloses the structural formulas of five specific polyaromatic amides which come within the purview of the present invention, as well as their solubility and elementary analysis.

The 1,4-para substituted diphenyl butadiene is the key intermediate in the synthesis of polymers PA-I to PA-V as illustrated in Table I. Although 1,4-diphenyl butadiene has been prepared heretofore by a number of workers, the preparation of the para substituted diphenyl butadiene monomer used in the synthesis of this invention is not known. In the present invention, the butadiene monomer is prepared in accordance with the series of reactions illustrated in Examples 2 to 8. These examples disclose specifically the preparation of the various monomers used in synthesizing the specific acid chloride of 1,4-bis-p-carboxy-phenyl-1,3,butadiene (XI) monomer which in turn is used in preparing the polymeric amides of this invention.

EXAMPLE 2

Methyl- -bromotoluate(IV).

Methyl- -bromotoluate was prepared by the method of Fuson and Cooke, as disclosed in J. Am. Chem. Soc., 62, 1180, (1940), by bromination of p-toluylchloride and subsequent esterification with methanol. Our product distilled at 105°–110° C./0-1 mm. Recrystallization from hexane gave 85 g of white needles. Yield 74.% m.p. 54°–55° C. (lit. 54°–55° C.). The infrared spectrum (Nujol) showed absorption at 1720 cm$^{-1}$

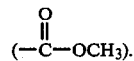
(—C—OCH$_3$).

NMR (CDCl$_3$) showed δ3.8(s,—COOCH$_3$,3), 4.4(s, —CH$_2$Br,2), and 7.2–8.0 (q, aromatic, 4).

EXAMPLE 3 p-Carbomethoxybenzaldehyde (V).

A mixture of 68.7 g (0.3 mole) of methyl- -bromotoluate, 84 g (0.6 mole) of hexamethylenetetramine, 150 ml of acetic acid and 150 ml of water were refluxed with stirring for two hours. Ninety ml of concentrated hydrochloric acid was then added and kept at room temperature for 15 minutes. The cooled solution was extracted with ether, washed with water, 10% NaHCO$_3$ solution, water and dried. Evaporation of the solvent and recrystallization of the residue from petroleum ether gave 35 g of p-carbomethoxybenzaldehyde, yield 71% m.p. 61°–63° C. (lit. m.p. 61°–63° C.). The infrared spectrum showed absorption at 1720 cm$^{-1}$

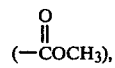
(—COCH$_3$), 1690 cm$^{-1}$ (—CHO). NMR (CDCl$_3$) δ3.8 (s, —COOCH$_3$, 3), 7.8-8.2 (m, aromatic, 4), and 10.2 (s, —CHO, 1).

EXAMPLE 4

Formylmethyltriphenylphosphorane (VI).

This compound has been prepared by S. Trippett and D. M. Walker. We used a slightly modified procedure. In a 3-necked 2-l flask, fitted with a mechanical stirrer, dropping funnel, condenser and an inlet for N$_2$ gas, 250 ml ethereal 1.16 N-butyl lithium was added to a stirred suspension of 107 g of methyl triphenyl phosphonium bromide in 1-l of ether. After stirring for an hour, the solution was slowly added to a stirred solution of 27 g of ethyl formate in 500 ml of ether. The mixture was

TABLE I
SOLUBILITY AND ELEMENTARY ANALYSIS OF POLYAMIDES

| Polymer | Structure | DMF 5% LiCl | DMA | H$_2$SO$_4$ |
|---------|-----------|-------------|-----|-------------|
| PA-I | —C(O)—C$_6$H$_4$—CH=CH—CH=CH—C$_6$H$_4$—C(O)—NH—C$_6$H$_4$—NH— | SW | SW | SW |
| PA-II | —C(O)—C$_6$H$_4$—CH=CH—CH=CH—C$_6$H$_4$—C(O)—NH—C$_6$H$_4$—NH— | SW | SW | SW |
| PA-III | —C(O)—C$_6$H$_4$—CH=CH—CH=CH—C$_6$H$_4$—C(O)—NH—C$_6$H$_4$—C$_6$H$_4$—NH— | SW | SW | SW |
| PA-IV | —C(O)—C$_6$H$_4$—CH=CH—CH=CH—C$_6$H$_4$—C(O)—NH—C$_6$H$_4$—S(O)$_2$—C$_6$H$_4$—NH— | SW | SW | SW |
| PA-V | —C(O)—C$_6$H$_4$—CH=CH—CH=CH—C$_6$H$_4$—C(O)—NH—C$_6$H$_4$—O—C$_6$H$_4$—NH— | SW | SW | SW |

|         | calcd. | | | found | | |
|---------|--------|------|------|-------|------|------|
| Polymer | C%     | H%   | N%   | C%    | H%   | N%   |
| PA-I    | 78.72  | 4.81 | 7.63 | 78.66 | 4.92 | 7.59 |
| PA-II   | 78.72  | 4.81 | 7.63 | 78.63 | 4.69 | 7.48 |
| PA-III  | 81.48  | 4.95 | 6.36 | 81.32 | 4.87 | 6.18 |
| PA-IV   | 71.19  | 4.34 | 5.52 | 70.92 | 4.27 | 5.43 |
| PA-V    | 78.67  | 4.80 | 6.15 | 78.54 | 4.72 | 5.97 |

SW = Swollen stirred for one hour, extracted with diluted hydrochloric acid (3×250 ml) and the combined extracts were made alkaline with dilute sodium hydroxide solution. The organic portion was extracted with benzene, washed with water and dried. Evaporation of the solvent and recrystallization from acetone gave 60 g of formylmethyltriphenylphosphorane m.p. 186°–187° C. (lit. m.p. 187°–187° C.). The infrared spectrum showed absorption at 1700 cm$^{-1}$ (—CHO) NMR (CDCl$_3$) δ7.2–8.0 (m, aromatic, 15), 8.3(d,=C$\underline{H}$,1), and 9.3 (d, CHO, 1).

EXAMPLE 5 p-Carbomethoxybenzyltriphenyl phosphonium bromide (VII).

A mixture of 46 g (0.2 mole) of methyl-α-bromotoluate and 105 g (0.4 mole) of triphenyl phosphine in 800 ml of dry benzene was refluxed for two hours. After 15 minutes, the phosphonium bromide started precipitating out from the solution. After cooling the flask to room temperature, the solid was filtered, washed with plenty of petroleum ether and dried. The yield was 98 g m.p. 258°–260° C. The infrared spectrum showed absorption at 1720 cm$^{-1}$

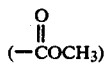

NMR (CDCl$_3$) showed 3.8

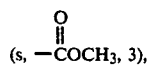

5.5–5.8 (d, —CH$_2$-p$^+$, 2), and 7–8 (m,aromatic, 19). The phosphonium bromide was used in the next stop without further purification.

EXAMPLE 6

4-Carbomethoxycinnamaldehyde (VIII).

A solution of 27.3 g (0.09 mole) of formyl methyltriphenyl phosphonium bromide and 14.8 g (0.09 mole) of p-carbomethoxybenzaldehyde in 900 ml of dry toluene was refluxed under nitrogen for 24 hours. After evaporating toluene under reduced pressure, the residue was chromatographed over silica column with 5% ethyl acetate in petroleum ether as eluant. The second fraction obtained by using 10% ethyl acetate in petroleum ether gave 4-carbomethoxycinnamaldehyde. Recrystallization from benzene gave 12.5 g 4-carbomethoxycinnamaldehyde, yield 73% m.p. 99°–101° C. The infrared spectrum showed absorption at 1720 cm$^1$ (COOCH$_3$), 1680 cm$^{-1}$ (CHO), and 1620 cm$^{-1}$ (—CH=CH—). NMR (CDCl$_3$) showed δ3.8 (s, —COOCH$_3$, 3) 6.5–7.1 (m,=CH—CHO, 1), 7.3–7.6 (m, aromatic, 4), 7.9–8.1 (d, —C$\underline{H}$=, 1), and 9.8 (d, —CHO, 1). Analysis calculated for C$_{11}$H$_{10}$O$_3$:C, 69.42%, H, 5.2%. Found: C, 68.69%, H, 5.26%.

EXAMPLE 7

1,4-Bis-p-carbomethoxyphenyl-1,3-butadiene (IX).

To a stirred mixture of 10.5 g (0.055 mole) of 4-carbomethoxycinnamaldehyde, 53.9 g (0.11 mole) of 4-carbomethoxybenzyltriphenyl phosphonium bromide, and 3.7 g (0.01 mole) of tetrabutylammonium iodide in 250 ml of dichloromethane 400 ml of 50% potassium carbonate was added drop by drop. After the addition, the mixture was stirred for three hours at room temperature. The dichloromethane was separated, washed with water, dried and evaporated. The residue was triturated with ether to remove triphenylphosphine oxide. Recrystallization from large volume of hot chloroform gave 14.6 g of 1,4-bis-p-carbomethoxyphenylbutadiene, yield 82% m.p. 242°–243° C. The geometric isomers were separated by fractional crystallization from chloroform, one isomer (3 parts) melting at 235°–237° C. and the other isomer (7 parts) at 249°–250° C. However, the mixture of isomers was used for the next step. The infrared spectrum showed absorption at 1720 cm$^{-1}$ (—COOCH$_3$) 1610 cm$^{-1}$ (—C=C—), 965 cm$^{-1}$ (trans—C=C—) and 720 cm$^{-1}$ (cis—C=C—). NMR (CDCl$_3$) showed δ3.9 (s, —COOCH$_3$,) 6.4–6.8 (m, =CH—C$\underline{H}$=,2), 7.2–7.4 (m, aromatic, 8) and 7.9–8.1 (m, C$\underline{H}$=C—C=C$\underline{H}$, 2). Mass spectrum gave molecular ion peak at 322. Analysis calculated for C$_{20}$H$_{18}$O$_4$; C, 74.5%; H, 5.61%. Found: C, 74.57%; H, 5.61%.

EXAMPLE 8

1,4-Bis-p-carboxyphenyl-1,3-butadiene (X).

10 g of 1,4-bis-p-carbomethoxyphenyl-1,3butadiene in 500 ml of pyridine and 20% of 100 ml of sodium hydroxide were gently refluxed with stirring for three hours under nitrogen. After cooling, the precipitated solid was filtered and washed with plenty of ether to remove pyridine. Neutralization with boiling 20% hydrochloric acid gave 9 gm of the desired acid. Yield, quantitative. This acid did not melt below 360° C. The infrared spectrum showed absorption at 3450 cm$^{-1}$ (hydroxyl), 1690 cm$^{-1}$ (C=O of the carboxylic acid), and 1610 cm$^{-1}$ (—C=C—). The acid was used in the next step without further purification.

EXAMPLE 9

Acid Chloride of 1,4-bis-p-carboxyphenyl-1,3-butadiene (XI).

8.9 g (0.03 mole) of 1,4-bis-p-carboxyphenyl-1,3-butadiene and three drops of pyridine in 90 ml of thionyl chloride was gently refluxed with stirring for six hours. The excess thionyl chloride was distilled off and the last traces of thionyl chloride were removed by distillation with dry benzene. Recrystallization from dichloromethane gave 9.1 g of the acid chloride, yield 92% m.p. 228°–230° C. The infrared spectrum showed absorption at 1720 cm$^{-1}$ (—COCl) and 1610 cm$^{-1}$ (—C=C—). NMR (CDCl$_3$) showed δ6.1–7.2 (m, aromatic, CH=CH—CH=CH, 12). Analysis calcuated for C$_{18}$H$_{12}$O$_2$Cl$_2$; C, 65.20%; H, 3.68%; Cl, 21.41%. Found: C, 65.08%; H, 3.69%; Cl, 20.73%.

As was disclosed above, the 1,4-p-substituted phenyl butadiene is the key intermediate in the invention. However, although the preparation of 1,4-diphenyl butadiene has been reported heretofore, the synthesis of the substituted phenylbutadiene used in this invention is unknown. Since the dienes are more commonly prepared through the conventional Witting Reaction, it would be expected that the monomer IX might be obtained either by one step or multi step methods, as shown below:

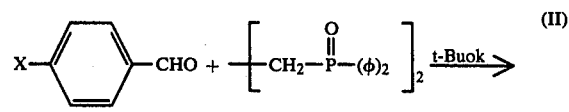 (II)

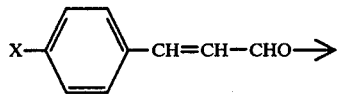

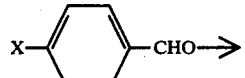

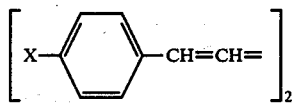

Unfortunately, the methods exemplified by reactions II and III were discarded because of two reasons: (A) the starting phosphorus compound was expensive and could not be recovered, and (B) several attempts to synthesize the monomer IX gave poor or no yield. However, as shown in Examples 2 to 9, the preparation of p-carbomethoxy-cinnamaldehyde VIII was achieved in 73% yield, which was then converted to 1,4-bis-p-carbomethoxyphenyl-1,3-butadiene IX in 82% yield. The carbomethoxy group, which was essential for the synthesis of the polymer, was kept intact throughout the operation by selecting milder experimental conditions.

From an examination of the above-mentioned, it will be seen that the present invention provides a novel group of polyaromatic amides which can be used effectively as laminating resins in the fabrication of a variety of laminated structures. These polymers exhibit excellent thermal stability and strength after polymerization as well as an absence of the gaseous voids which heretofore proved deleterious in the fabrication of laminated structures.

Also, it should be understood by those skilled in the art that various alterations and modifications of the present invention can be undertaken without altering the spirit thereof and that all such modifications as are encompassed within the scope of the appended claims are intended to be included herein.

What is claimed is:

1. A resinous, polyaromatic amide having 1,3-butadiene groups as integral units of the polymer chain and consisting essentially of recurring units having the following structural formula:

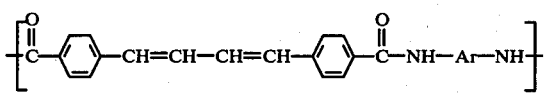

wherein Ar is a radical selected from the group consisting of

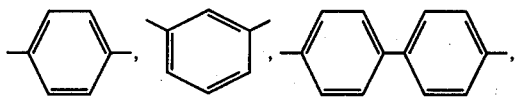

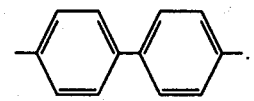

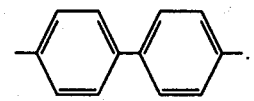

2. A resinous, polyaromatic amide in accordance with claim 1 wherein said Ar radical is

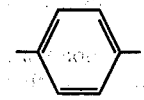

3. A resinous, polyaromatic amide in accordance with claim 1 wherein said Ar radical is

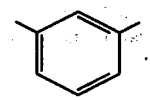

4. A resinous, polyaromatic amide in accordance with claim 1 wherein said Ar radical is

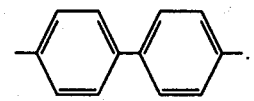

5. A resinous, polyaromatic amide in accordance with claim 1 wherein said Ar radical is

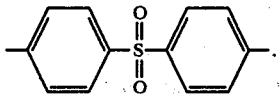

6. A resinous, polyaromatic amide in accordance with claim 1 wherein said Ar radical is

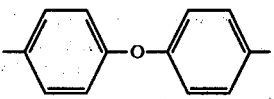

7. A process for synthesizing a resinous, polyaromatic amide containing 1,3-butadiene groups as integral units of the polymer chain which comprises the steps of (A) forming a reaction mixture between (1) the acid chloride of 1,4-bis-p-carboxyphenyl-1,3-butadiene and (2) an aromatic diamine selected from the group consisting of p-diaminobenzene, m-diaminobenzene, benzidene, bis(4-aminobenzene) sulfone and 4,4-oxydianiline within an atmosphere of nitrogen maintained at a temperature of about 0° C.; (B) allowing said mixture to react for a period of about three hours; and (C) separating the resultant resinous, polyaromatic amide.

8. A process in accordance with claim 7 wherein said diamine is p-diaminobenzene.

9. A process in accordance with claim 7 wherein said diamine is m-diaminobenzene.

10. A process in accordance with claim 7 wherein said diamine is benzidene.

11. A process in accordance with claim 7 wherein said diamine is bis(4-aminobenzene) sulfone.

12. A process in accordance with claim 7 wherein said diamine is 4,4'-oxydianiline.

* * * * *